United States Patent
Andres et al.

(10) Patent No.: US 12,424,075 B2
(45) Date of Patent: Sep. 23, 2025

(54) VEHICLE FILTERING HUB

(71) Applicant: Ford Global Technologies, LLC, Dearborn, MI (US)

(72) Inventors: Russell Andres, Riverview, MI (US); Yeo-Wang John Lee, Plymouth, MI (US); David Kaiser, Allen Park, MI (US); Marshall Earnest, Seattle, WA (US); Bradley G. Hochrein, Dexter, MI (US); Chitra Varanasi, Canton, MI (US); David Pericak, Clinton Township, MI (US); Robert Ralph Iorio, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 18/428,588

(22) Filed: Jan. 31, 2024

(65) Prior Publication Data
US 2025/0246060 A1    Jul. 31, 2025

(51) Int. Cl.
*G08B 21/18*    (2006.01)
*G05B 23/02*    (2006.01)

(52) U.S. Cl.
CPC ....... *G08B 21/187* (2013.01); *G05B 23/0291* (2013.01); *G08B 21/182* (2013.01)

(58) Field of Classification Search
CPC . G08B 21/187; G08B 21/182; G05B 23/0291
See application file for complete search history.

(56) References Cited

U.S. PATENT DOCUMENTS

| | | | |
|---|---|---|---|
| 9,500,114 B2 * | 11/2016 | Shimazu | F01N 3/18 |
| 9,517,429 B2 * | 12/2016 | Beier | B01D 46/0086 |
| 10,065,143 B2 * | 9/2018 | Beier | B01D 46/429 |
| 10,275,975 B2 | 4/2019 | High et al. | |
| 12,235,117 B2 * | 2/2025 | Martin | G01C 21/3461 |
| 2007/0084808 A1 * | 4/2007 | Williamson | C02F 9/00 |
| | | | 210/241 |
| 2009/0250407 A1 * | 10/2009 | Delano | B01F 23/2341 |
| | | | 210/241 |
| 2015/0052978 A1 * | 2/2015 | Beier | B01D 46/0086 |
| | | | 73/38 |
| 2016/0317962 A1 * | 11/2016 | Beier | B01D 46/0086 |
| 2017/0225658 A1 * | 8/2017 | Quintero Perez | B60L 1/003 |
| 2018/0283307 A1 * | 10/2018 | Dudar | F02M 26/49 |
| 2023/0132109 A1 * | 4/2023 | Zhang | B01D 61/58 |
| | | | 210/636 |
| 2023/0331585 A1 * | 10/2023 | Williams | C02F 1/008 |
| 2024/0019256 A1 * | 1/2024 | Martin | G01C 21/3697 |
| 2024/0044320 A1 * | 2/2024 | Chavez | F04D 29/708 |

FOREIGN PATENT DOCUMENTS

| | | |
|---|---|---|
| CN | 101880096 A | 11/2010 |
| CN | 202046960 U | 11/2011 |

\* cited by examiner

*Primary Examiner* — Hoi C Lau
(74) *Attorney, Agent, or Firm* — Joseph Zane; Brooks Kushman P.C.

(57) ABSTRACT

A vehicle operates as a hub for locating and filtering water. The vehicle receives filter information over a local network connection between the vehicle and a water filter. The vehicle sends the filter information over a wide-area network from the vehicle to a cloud server. A human machine interface (HMI) remote from the filter displays filter details based on the filter information that explain aspects of the operation of the filter.

20 Claims, 13 Drawing Sheets

VEHICLE FILTERING HUB

TECHNICAL FIELD

Aspects of the disclosure generally relate to using a vehicle as a hub for locating and filtering water.

BACKGROUND

Phone-as-a-key (PaaK) systems are being introduced to allow users to utilize their phones to unlock a vehicle without requiring a key fob device. These systems may operate similar to a key fob, but where the phone communicates with the vehicle over BLUETOOTH LOW ENERGY (BLE), Ultra-Wide Band (UWB), or other mobile device wireless technologies.

Portable water filters may be used by backpackers or hikers to ensure a supply of clean water. The water filters may use various techniques, such as filter membranes, chlorine or iodine tablets, or other filter media.

SUMMARY

In one or more illustrative examples, a method of using a vehicle as a hub for locating and filtering water includes receiving, by the vehicle, filter information over a local network connection between the vehicle and a water filter; sending the filter information over a wide-area network from the vehicle to a cloud server; and displaying, to a human machine interface (HMI) remote from the filter, filter details based on the filter information that explain aspects of the operation of the filter.

In one or more illustrative examples, a vehicle operating as a hub for locating and filtering water includes a network device and one or more computing devices. The one or more computing devices are configured to receive filter information over a local network connection to a water filter, the filter information including data from pressure sensors, temperature sensors, and/or flow sensors of the filter, send the filter information over a wide-area network to a cloud server, the cloud server configured to utilize a machine learning model to determine filter details based on the filter information that explain aspects of the operation of the filter, receive, over the wide-area network a command from the cloud server based on the filter details, and send the command over the local network connection to the filter to automatically control the filter.

In one or more illustrative examples, a mobile device has a mobile control application for utilizing a vehicle operating as a hub for locating and filtering water. The mobile device includes a network device; an output device configured to display an HMI; and one or more computing devices. The one or more computing devices are configured to display, to the HMI, filter details based on filter information that explain aspects of the operation of a water filter, the filter details being received via the network device over a wide-area network from a cloud server, the cloud server having received the filter information over the wide-area network from a vehicle, the vehicle in turn having received the filter information over a local network connection between the vehicle and the water filter.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Water filters may be used for outdoor activities such as camping. However, water filters may be inconvenient to use. Water filters generally lack connectivity for diagnostics or to facilitate remote monitoring. Yet, by associating the filter with the user's vehicle and mobile device, various additional features may be implemented. For example, the status of the filter may be monitored remotely via the user's vehicle and or mobile device HMI. Alerts of conditions, such as water advisories, may also be communicated to the user via the HMI. Additionally, a machine learning model may be trained based on data from the filters over time to anticipate upcoming conditions or issues, and may provide that information to the user via the HMI and/or to adjust the configuration of the filter automatically. Further aspects of the operation of the filters are discussed in detail herein.

Figure 1:
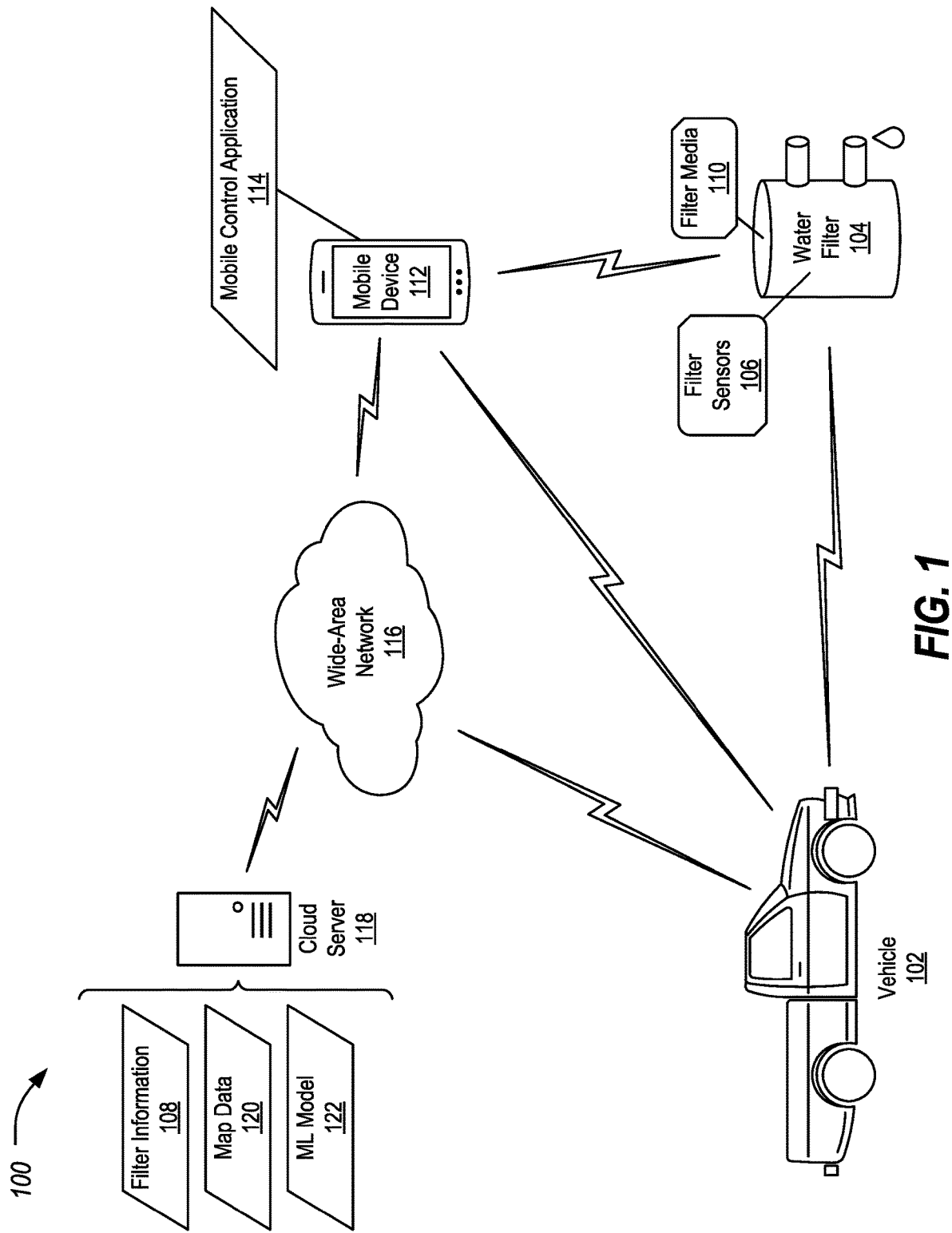
FIG. 1 illustrates an example system for using a vehicle as a hub for locating and filtering water.

FIG. 1 illustrates an example system 100 for using a vehicle 102 as a hub for locating and filtering water. The system 100 includes a vehicle 102 configured to provide transport and navigation and a filter 104 configured to collect water and provide information about the water via various filter sensors 106. A mobile device 112 may utilize a mobile control application 114 to keep the user informed of water-related events. A wide-area network 116 may provide connectivity to the devices of the system 100. A cloud server 118 may provide a data sink and computing services to the vehicle 102, filter 104, and/or mobile device 112 via the wide-area network 116.

The vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received vehicle-to-everything (V2X) data. The level of automation may vary between different levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs), e.g., as defined by International Organization for Standardization (ISO) 3779 and ISO 4030. It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may act as a central hub for the user's water collection needs. The vehicle 102 may be configured to transport the filter 104, the user, and/or collected water, while also providing wireless connectivity to enable the user to more easily collect water and to ensure the reliability of the water supply. The vehicle 102 may also be configured to supply energy to the filter 104 as well as to help the user with the task of finding and collecting drinking water.

The filter 104 may be one of various devices configured to receive water and remove impurities from the water. This may include removing sediment, bacteria, and/or chemicals from the water. In many cases, water is passed through filter media 110, such as a fine physical barrier, a chemical pack, or biological media. Once filtered, the water may be retained in a container or otherwise made available for use.

The filter 104 may include various filter sensors 106 and instrumentation. The filter sensors 106 may be configured to provide various filter information 108 about the operation of the filter 104. The filter sensors 106 may include flow sensors, temperature sensors, pressure sensors, etc. The filter information 108 may include, as some nonlimiting examples: water filtered over the lifetime of the filter 104, ambient temperature of the filter 104, water filtered over a current filtering session of the filter 104, gallons of water filtered by filter media 110 installed to the filter 104, water pressure within the filter 104, filter operational mode and status (e.g., filtering, standby, full, empty, etc.), as some non-limiting examples. The filter 104 may also provide a filter media 110 life system that indicates when the filter media 110 requires replacement, e.g., as opposed to when a timer has run out independent of usage.

The filter 104 may also utilize the filter sensor 106 to identify characteristics of the environment around the filter 104. These characteristics may be used to aid in diagnostics and troubleshooting and/or alerts, such as to provide an alert if the filter media 110 of the filter 104 is clogged or is no longer receiving water to be filtered. For instance, the filter sensors 106 may be used to indicate that the intake is no longer submerged or is clogged.

The mobile device 112 may be any of various types of portable computing device, such as cellular phones, tablet computers, smart watches, laptop computers, portable music players, key fobs, or other such devices brought into the vehicle 102 and having processing and communications capabilities. The mobile device 112 may include one or more processors configured to execute computer instructions, and a storage medium on which the computer-executable instructions and/or data may be maintained. The mobile control application 114 may be installed to the mobile device 112 to allow the mobile device 112 to interact with aspects of the filter 104. Further aspects of the operation of the mobile control application 114 are discussed in detail herein.

The wide-area network 116 may include one or more interconnected communication networks such as the Internet, a cable television distribution network, a satellite link network, a local area network, and a telephone network, as some non-limiting examples. The wide-area network 116 may facilitate the communication of data between the vehicles 102, filters 104, and mobile devices 112 of the system 100.

In some examples, the mobile control application 114 of the mobile device 112 may communicate with the vehicle 102 over the wide-area network 116, while the vehicle 102 may communicate with the filter 104 over a local network connection, such as a Wi-Fi or a Bluetooth connection. In other examples, especially when the mobile device 112 is in proximity to the filter 104 and/or access to the wide-area network 116 is poor or unavailable, the mobile control application 114 of the mobile device 112 may communicate with the filter 104 directly over the local network connection.

The cloud server 118 may be configured to maintain various information and services for use by the vehicles 102 and mobile devices 112. In an example, the cloud server 118 may maintain historical filter information 108 received from the filters 104, e.g., over the wide-area network 116 from vehicles 102 connected to the filters 104 over local connections. In another example, the cloud server 118 may maintain map data 120 of areas with poor quality water, e.g., as provided by water or government agencies and/or via crowdsourcing. In another example, the cloud server 118 may maintain map data 120 of areas with water that can be filtered and/or information for use in providing navigation assistance to direct the user to the locations where water is available. The vehicle 102 and/or the mobile device 112 may provide mapping features based on the map data 120 maintained by the cloud server 118.

The vehicle 102 may also provide a digital manual to explain the operation of the filter 104 and/or to provide visual instructions for use of the filter 104. In some examples, this guide may synchronize with state information broadcast to the vehicle 102 from the filter 104, and/or may show the specific modes and/or options of the particular model of filter 104 in communication with the vehicle 102.

The mobile control application 114 may also provide alerts when a desired amount of water is collected by the filter 104. In some examples, the filter 104 may automatically turn itself off when the desired amount of water is collected.

The mobile control application 114 may also allow the user to share the location of the filter 104 with other users who desire water. This sharing may be performed via the cloud server 118 and/or via a third-party communications platform. In some examples, each filter 104 may have a corresponding web page hosted by the cloud server 118, such that a user can share a link to the user's own personal filter 104 web page, which may include information such as a map and location pin of the filter 104 when sharing is enabled. The mobile control application 114 may also monitor the location of the user's filter 104 for the user, so that the vehicle 102 may help the user remember where the filter 104 is located, and/or to ensure that the filter 104 is onboard before the user drives away in the vehicle 102.

The mobile control application 114 may also provide additional functions, such as suggestions to purchase of new filter media 110 when a machine learning model 122, e.g., as executed by the cloud server 118) predicts that filter media 110 will be required soon or when the filter 104 itself is about to need replacement. These notifications may also provide a link to a store where such purchases may be made by the user.

For example, the machine learning model 122 may receive filter information 108 such as amount of water flowing, lifetime water passed, current flow rate, pressure before primary filter media 110, pressure after primary filter media 110, whether filter 104 is actually pumping, any status info (e.g., whether the filter 104 is in a backwash cycle to run water backwards to clean the filter media 110, whether the filter 104 is filtering water, whether the filter 104 is on standby, etc.) The filter information 108 may also include information with respect to the surroundings of the filter 104, such as ambient temperature, geographic location, etc.

These inputs may be aggregated into a time series and matched to ground truth in training data to allow the mobile device 112 to learn which filter information 108 over time, e.g., using a recurrent neural network in one example. The outputs of the machine learning model 122 may indicate whether one or more conditions are likely to have occurred or may be expected to occur. These conditions may include for example, how used up the filter media 110 may be, whether a flow difference indicates poor filter clearing rate, whether a loss of pressure has occurred or is likely to occur for the filter 104, etc. In one example, the machine learning model 122 may also base replacement schedules in part on location. For instance, if the filter 104 is used in a location with a particular water quality, then the filter media 110 life may be influenced by that water quality.

Based on the outputs of the machine learning model 122, new operational parameters may be provided to the filter 104 to adjust the operation of the filter 104. This may include, for example, lowering the pump speed if the filter 104 is determined to be usable but clogged to some extent. This may also include sending a command to terminate pump operation if a potential issue is detected to have occurred to the filter 104. In other examples, alerts may be provided to the filter 104 or to the mobile device 112 of the user to indicate the occurrence of various conditions at the filter 104, and/or to communicate the expected remaining life of the filter media 110, the occurrence of water advisories in the vicinity of the filter 104, etc.

Figure 2:
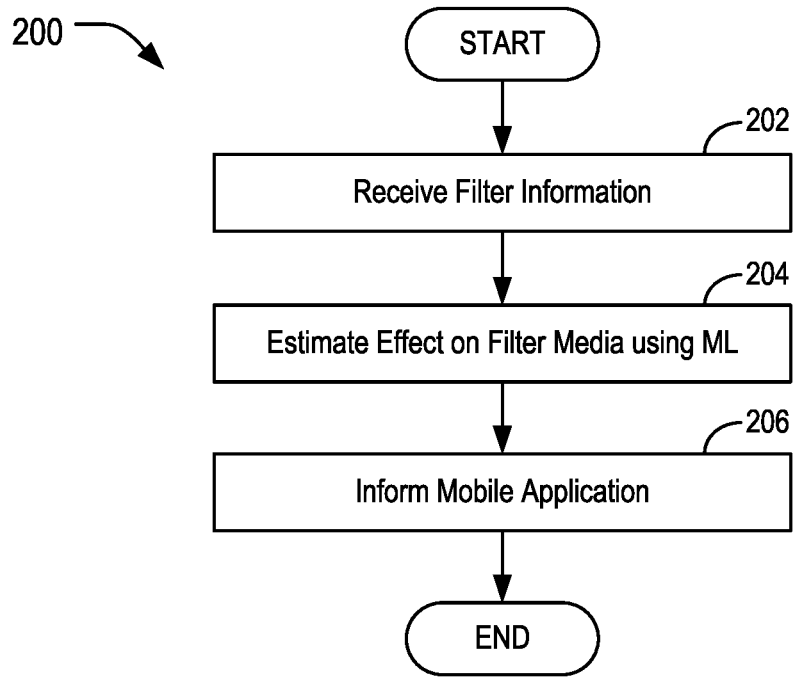
FIG. 2 illustrates an example process for predicting water usage of the filter.

FIG. 2 illustrates an example process 200 for predicting water usage of the filter 104. In an example the process 200 may be performed in the context of the system 100 discussed herein. For example, the cloud server 118 may be in communication with the vehicle 102 and the mobile device 112 over the wide-area network 116 and the vehicle 102 may be in communication with the filter 104 over a local network connection. This may accordingly allow the vehicle 102 to act as a hub for the water usage prediction of the filter 104.

At operation 202, the cloud server 118 receives filter information 108 from the filter 104. The filter information 108 may include information indicative of an identifier and/or location of the filter 104 to allow for the geolocation of the filter 104. The filter information 108 may also include status information such as how much water was filtered by the filter 104, a measure of the contaminants found in the water that was filtered, an amount of water flowing through the filter 104, the lifetime water passed through the filter 104, the current flow rate through the filter 104, the pressure before primary filter media 110, the pressure after primary filter media 110, whether the filter 104 is actually pumping, any status info (e.g., whether the filter 104 is in a backwash cycle to run water backwards to clean the filter media 110, whether the filter 104 is filtering water, whether the filter 104 is on standby, etc.) This information may be received to and maintained by cloud server 118.

At operation 204, the cloud server 118 estimates the effect on the filter media 110 for the planned usage. This may allow the cloud server 118 to determine how much life remains in the filter media 110. This estimate may be based on factors such as an expected water usage for the filter 104, e.g., based on a pattern of past water usage, and/or the amount of contaminants in the water where the filter 104 is being used. In an example, cloud server 118 may utilize the machine learning model 122 trained on filter information 108 and the known effects as ground truth, to provide the estimate.

At operation 206, the cloud server 118 sends the estimate to the mobile control application 114 of the mobile device 112. In an example, a message may be displayed by the mobile control application 114 on the screen of the mobile device 112 indicating the estimate. It should be noted that in other examples, the message may be sent to the vehicle 102 and displayed by the vehicle 102, instead of or in addition to being sent to the mobile device 112 for display.

Figure 3:
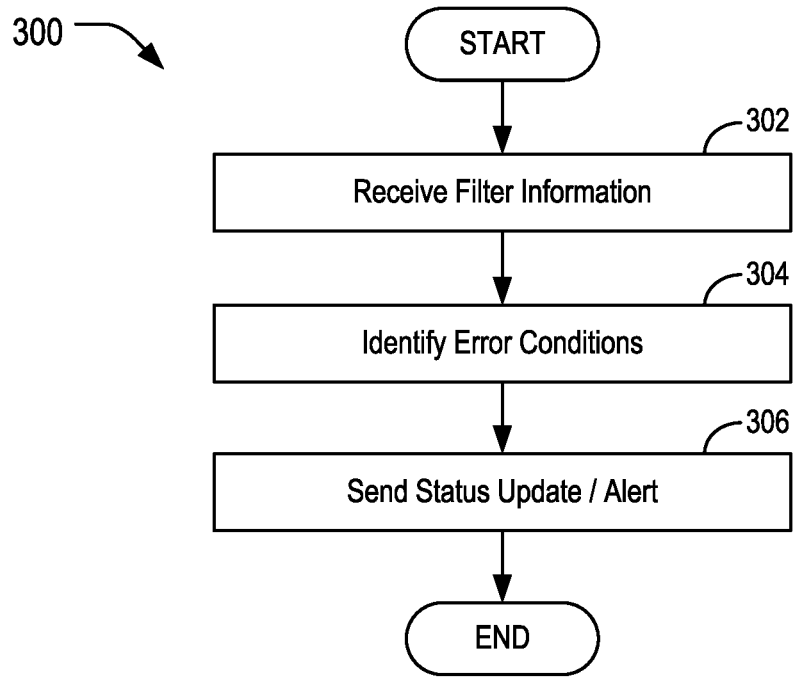
FIG. 3 illustrates an example process for alerting the user of an error condition at the filter.

FIG. 3 illustrates an example process 300 for alerting the user of an error condition at the filter 104. As with the process 200, the process 300 may be performed in the context of the system 100. For example, the cloud server 118 may be in communication with the vehicle 102 and the mobile device 112 over the wide-area network 116 and the vehicle 102 may be in communication with the filter 104 over a local network connection. This may accordingly allow the vehicle 102 to act as a hub for alerting the user of an error condition.

At operation 302, the cloud server 118 receives filter information 108 from the filter 104. This filter information 108 may include environmental information, such as whether the intake is not submerged or is clogged. For instance, the filter sensors 106 may include information such as the presence or absence of water at the intake, pressure before primary filter media 110, pressure after primary filter media 110, etc., which may be used to indicate the presence or absence of water.

At operation 304, the cloud server 118 utilizes the received filter information 108 to identify whether an error condition has occurred. For instance, the cloud server 118 may determine based on the information received at operation 302 that the intake is no longer receiving water flow or is likely to soon stop receiving water flow. This may be determined by the machine learning model 122 once trained to identify inputs that are indicative of worsening levels of intake water or a lack of water at the intake, for example.

At operation 306, the cloud server 118 sends a status update to the mobile control application 114 of the mobile device 112. For example, the cloud server 118 may remotely notify the user that something has gone wrong with water collection so that the user is able to fix the issue, e.g., instead of returning to the filter 104 and finding that no water was collected. Also, the notification may reduce the chance of issues occurring to the pump or other components of the filter 104 in case the water is no longer flowing. In other examples, the cloud server 118 may send the status update to the vehicle 102 to forward to the filter 104, e.g., to command the filter 104 to shut off, thereby preventing issues from occurring to the filter 104. It should be noted that in other examples, the message may be displayed by the vehicle 102, instead of or in addition to being sent to the mobile device 112 for display.

Figure 4:
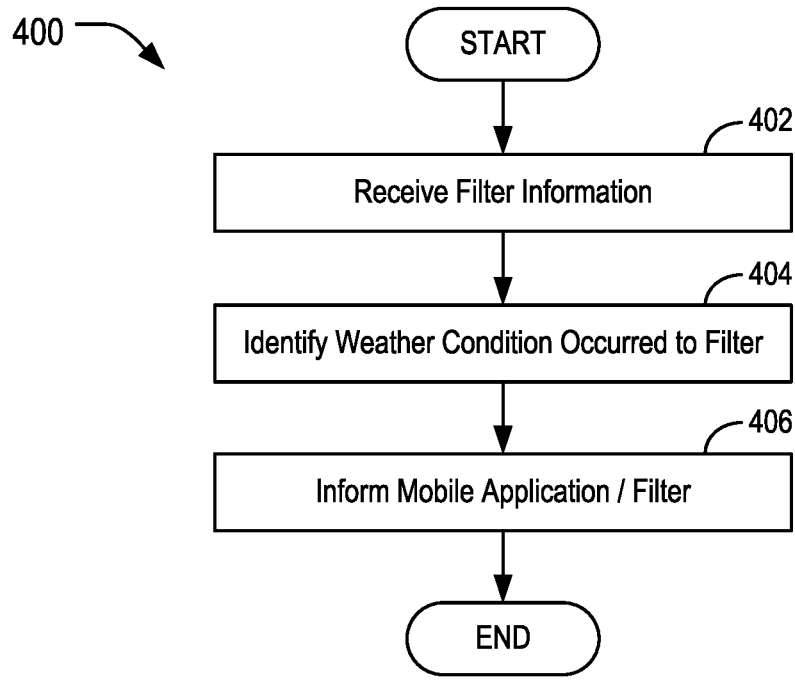
FIG. 4 illustrates an example process for alerting the user of a weather condition at the filter.

FIG. 4 illustrates an example process 400 for alerting the user of occurrence of a weather condition at the filter 104. As with the processes 200 and 300, the process 400 may be performed in the context of the system 100. For example, the cloud server 118 may be in communication with the vehicle 102 and the mobile device 112 over the wide-area network 116 and the vehicle 102 may be in communication with the filter 104 over a local network connection. This may accordingly allow the vehicle 102 to act as a hub for alerting the user of a weather condition.

At operation 402, the cloud server 118 receives filter information 108 from the filter 104. This filter information 108 may include environmental information, such as ambient temperature determined by filter sensors 106 of the filter 104 (or in other cases by a temperature sensor of the vehicle 102 through which the filter 104 is communicating with the cloud server 118). The filter information 108 may also include additional information, such as the location of the filter 104 (e.g., as determined by the connected vehicle 102).

At operation 404, the cloud server 118 determines if a weather condition has occurred to the filter 104. This may be determined in various ways, or a combination of various ways. For instance, the cloud server 118 may determine, based on a change in the filter information 108, that a freeze condition occurred to the filter 104. This may be identified based on the filter information 108, even if the filter 104 was inactive during the freeze and/or did not report freezing temperatures. Freezing conditions may permanently change the operating parameters of the filter 104 membrane, which may be detected by the pressure sensors. This may be seen because a freeze-affected filter 104 may be less effective or ineffective at filtering as compared to a filter 104 that has not experienced a freeze condition. The cloud server 118 may utilize the machine learning model 122 trained on filter information 108 for filters 104 labeled with ground truth as having experienced freeze conditions and those that have not, to provide the determination.

At operation 406, the cloud servers 118 informs the user of occurrence of the weather conditions. For example, the cloud server 118 may remotely notify the user via the mobile device 112 that the filter 104 operation is indicative of prior exposure to freezing temperatures. If the filter 104 was impaired due to cold, the user may be informed that the water may not be potable. In another example, operation of the filter 104 may be paused by the cloud server 118 until the user decides how to proceed. It should be noted that in other examples, the message may be displayed by the vehicle 102, instead of or in addition to being sent to the mobile device 112 for display.

In other examples, the cloud server 118 may also perform a direct detection of freezing conditions. This may be done, for example, responsive to receiving filter sensor 106 data indicative of a lack of water flow (in which case the filtering process may be automatically terminated). The cloud server 118 may also stop the filtering process if freezing is expected, e.g., based on weather forecasts. For instance, the cloud server 118 may access a weather server to retrieve the weather data for the location of the filter 104 to aid in the determination and/or confirmation of the freeze condition. In another example, the cloud server 118 may review the current temperature and/or the temperature trend for the actual ambient temperature data received at operation 402.

In another variation, the filter 104 may include a separate, possibly resettable phase-change element (for instance, a plunger attached to a container of water, which when it freezes, moves a bistable switch to a frozen position until manually moved back) or a temperature filter sensor 106 run off an internal battery of the filter 104 to detect freeze conditions as they occur even without external power and before the filter 104 is started (the point at which the freeze condition would normally be detected).

Figure 5:
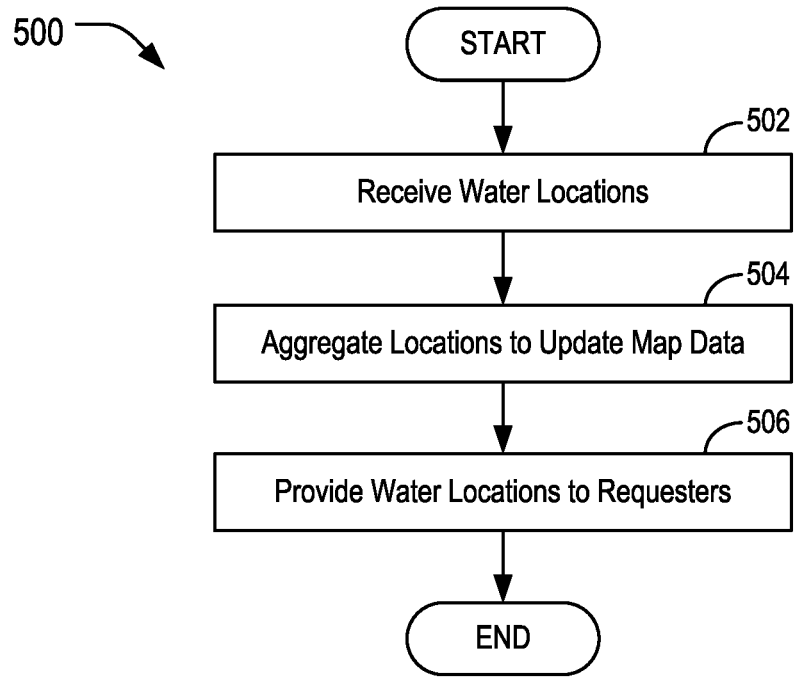
FIG. 5 illustrate an example process for helping the user to find sources of water for the filter.

FIG. 5 illustrate an example process 500 for helping the user to find sources of water for the filter 104. As with the processes 200-400, the process 500 may be performed in the context of the system 100. For example, the cloud server 118 may be in communication with the mobile device 112 and/or the vehicle 102 over the wide-area network 116. For instance, the user may select from the navigation of the vehicle 102 to navigate to a location where water is available.

At operation 502, the cloud server 118 receives locations of water that may be used for the filters 104. In an example, the cloud server 118 may receive user-submitted water source information indicative of new water sources or access locations discovered by the users. These may be submitted, in an example, via a user selecting an add new water source feature from the mobile control application 114, which may allow the user to select the user's current location and/or select a location on a map to include as a new water source. In another example, the mobile control application 114 may similarly include a feature to allow a user to select and indicate that an existing source of water noted in the map data 120 is no longer available, to allow for such stale water sources to be removed.

In another example, the cloud server 118 may poll public or commercial databases to discover new or removed sources of water. In yet another example, the cloud server 118 may process local legislation to discover if there are restrictions on collecting certain types of water in an area, to ensure that such locations are removed from the map data 120.

At operation 504, the cloud server 118 performs a data aggregation to update the map data 120 based on the input received at operation 502. In an example, the data aggregation may be performed periodically, such as nightly, weekly, monthly, etc. In some cases, the map data 120 may further indicate a last updated date for each water source, to allow the user to understand how recent the information is in the map data 120 about the water sources.

At operation 506, the cloud server 118 sends the map data 120 in response to a user request for water sources. In an example. The cloud server 118 may provide navigation functionality to indicate the water sources in the map data 120 as an overlay on a map of the location of the vehicle 102, mobile device 112, or another location to which the user intends to travel. The in-vehicle navigation system and/or the navigation functionality of the mobile device 112 (or a third party mapping system) may be used to navigate the user to any selected water source, either on foot or via vehicle 102. This may accordingly let the user query for locations to place the filter 104 for use where water is present.

As a variation, the cloud server 118 may monitor the location of the user's filter 104 for the user. This may be done to ensure that the vehicle 102 remembers where the filter 104 is located, and/or to ensure that the filter 104 is onboard before the user drives away in the vehicle 102. In an example, responsive to the vehicle 102 being activated or set to a motive mode (such as into drive or reverse), the vehicle 102 may access the cloud server 118 to retrieve information related to the user's filters 104. If the filters 104 are not detected as present by the vehicle 102 (e.g., via wired or wireless connectivity of the vehicle 102), then the vehicle 102 may alert the user that the filters 104 are not onboard. In yet another example, the vehicle 102 may maintain the locations and/or identifiers of the filters 104 itself, without accessing the cloud server 118. However, this may only be useful in instances where the user has not otherwise moved the filters 104 or has not added or removed filters 104 without informing the vehicle 102.

Figure 6:
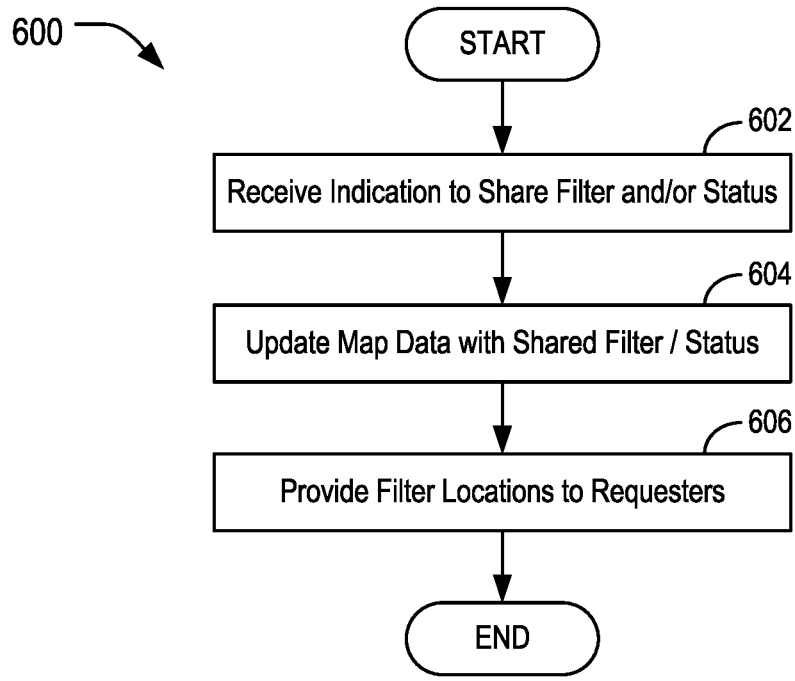
FIG. 6 illustrates an example process for sharing the user's filter location with other users.

FIG. 6 illustrates an example process 600 for sharing the user's filter 104 location with other users. As with the processes 200-500, the process 600 may be performed in the context of the system 100. For example, the cloud server 118 may be in communication with the vehicle 102 and the mobile device 112 over the wide-area network 116 and the vehicle 102 may be in communication with the filter 104 over a local network connection.

At operation 602, the cloud server 118 receives a selection from the mobile control application 114 of a user sharing the filter 104. In some examples, the filter 104 may further notify the cloud server 118 that the filter 104 is in use. This notification may occur, for example, through the filter 104 in communicating with the cloud server 118 over the wide-area network 116 via the vehicle 102. As noted at operation 202, the filter information 108 may include information indicative of an identifier and/or location of the filter 104 to allow for the geolocation of the filter 104. The filter information 108 may also include status information such as how much water was filtered by the filter 104, a measure of the contaminants found in the water that was filtered, etc. This information may be received to and maintained by cloud server 118.

At operation 604, the cloud server 118 updates the map data 120 to indicate the filter 104 as shared for users querying the map data 120 for water and/or filters 104. The cloud server 118 may further update the map data 120 to indicate the current status of the filter 104, such as whether the filter 104 is currently operational and/or an amount of filtered water available at the filter 104.

At operation 606, the cloud server 118 sends the map data 120 in response to a user request for filter 104 sources. In an example, other user's vehicles 102 may show the locations of shared filters 104 on the navigation screen of the vehicle 102. This may allow the other users to see if someone near them is sharing their filter 104. In another example, the user may share a link to their filter 104 (e.g., as hosted by the cloud server 118) via social media or another online service, where it can be visited to see the location of the filter 104.

Figure 7:
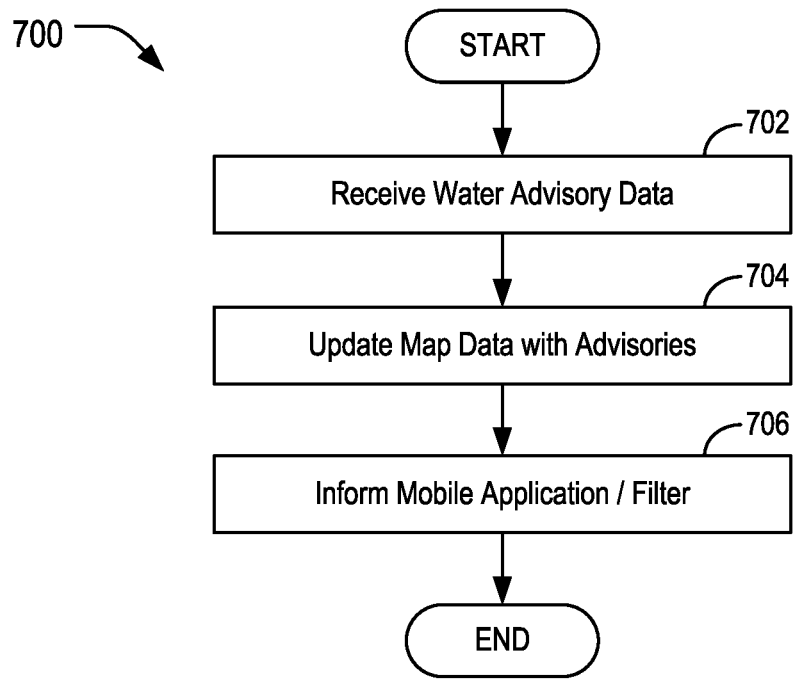
FIG. 7 illustrates an example process for sharing water advisory information with with users of the system.

FIG. 7 illustrates an example process 700 for sharing water advisory information with users of the system 100. As with the processes 200-600, the process 700 may be performed in the context of the system 100.

At operation 702, the cloud server 118 receives locations of water advisories that may affect whether the user should utilize the water. In an example, the cloud server 118 may poll public or commercial water advisory databases to discover new or removed water advisories. In another example, the cloud server 118 receives crowdsourced locations of water where a user indicates that the water appears or measures as requiring filtering. These may be submitted, in an example, via a user selecting a water source or area using the mobile control application 114, which may allow the user to select the user's current location and/or select a location on a map to include as a new water source. In another example, the mobile control application 114 may similarly include a feature to allow a user to select and indicate that an existing source of water noted in the map data 120 is no longer appears as or no longer measures as requiring filtering, to allow for old water advisories to be removed.

At operation 704, the cloud server 118 performs a data aggregation to update the map data 120 based on the water advisories received at operation 502. In an example, the data aggregation may be performed periodically, such as nightly, weekly, monthly, etc. In other example the updates may be made substantially real-time to ensure the latest water advisory information is available. In some cases, the map data 120 may further indicate a last updated date for each water source, to allow the user to understand how recent the information is in the map data 120 about the water sources.

At operation 706, the cloud server 118 sends the map data 120 in response to a user request for filter 104 sources. In an example, the vehicles 102 may show the locations of the water advisories on the navigation screen of the vehicle 102. This may allow the users to be informed of areas having bad water, e.g., to provide an option to not stop in those areas, or to note that the user should use the filter 104 to clean the water before use. In another example, the user may be notified via the mobile control application 114 that their home or the current area in which the user is located has water that required filtration and to use the filter 104.

Thus, by using the cloud server 118, various filter information 108 may be processed by the cloud server 118, and alerts, commands, and other analytics may be determined. These results may be displayed to the user via the mobile control application 114 installed to the user's mobile device 112.

Figure 8:
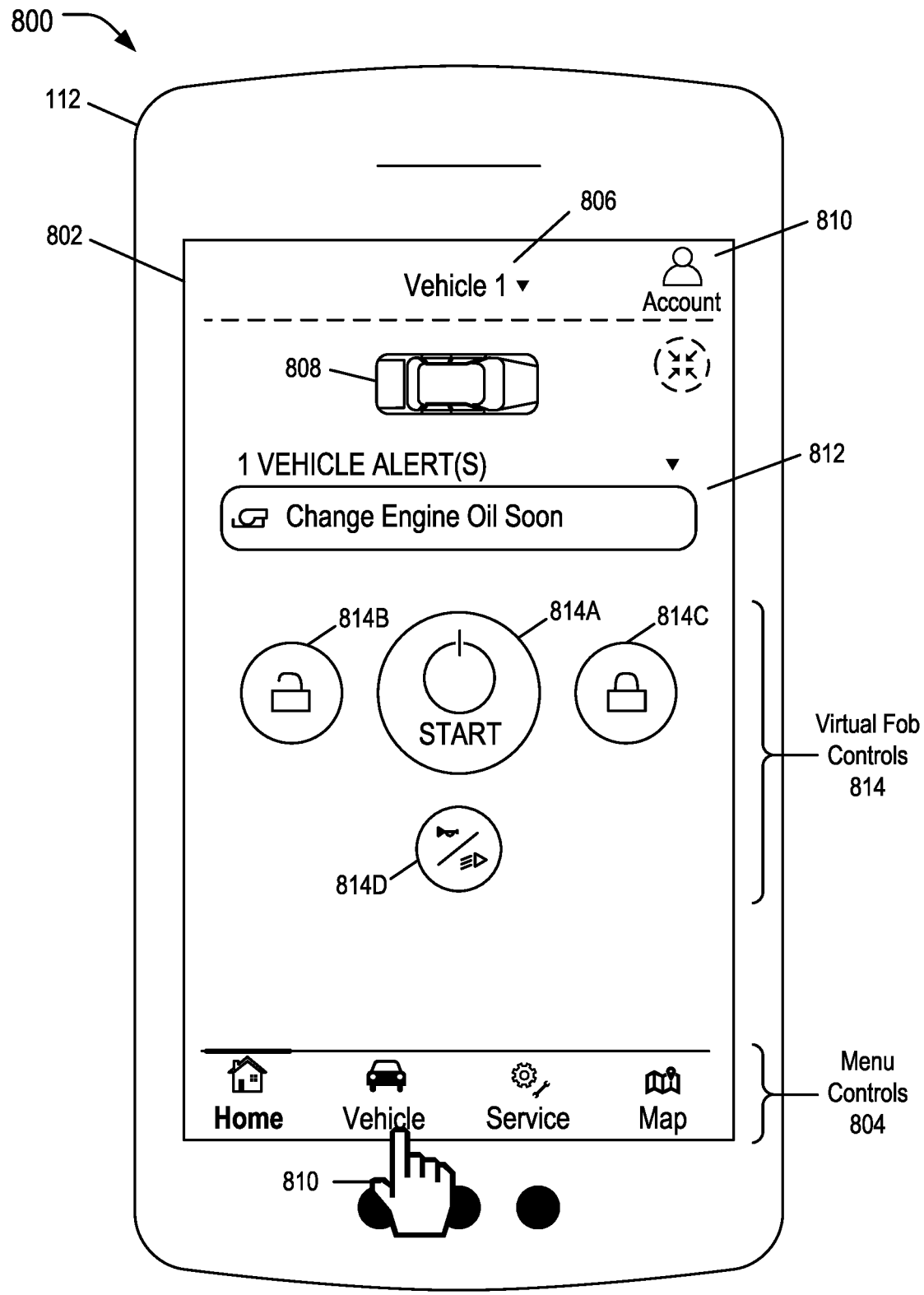
FIG. 8 illustrates an example home screen of the mobile control application displayed to the human machine interface (HMI) of the mobile device.
Figure 9:
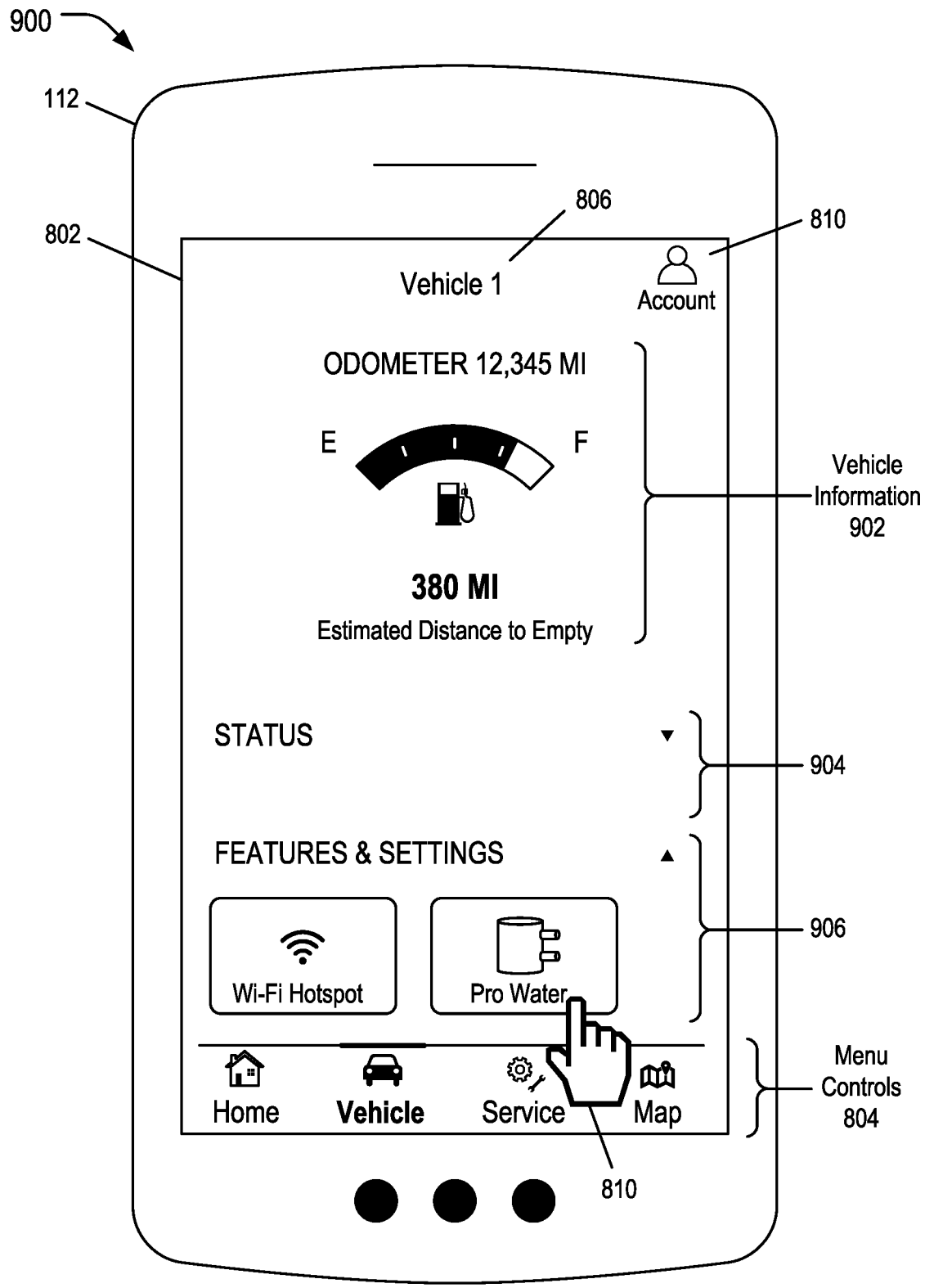
FIG. 9 illustrates an example vehicle screen of the mobile control application displayed to the HMI of the mobile device.

FIG. 8 illustrates an example 800 of the home screen of the mobile control application 114 displayed to the HMI 802 of the mobile device 112. The HMI 802 may include various controls that are consistent across the screens of the mobile control application 114. These may include, for example, a set of menu controls 804 allowing the user to select from various portions of functionality. These may include the home screen, a vehicle screen, a service screen, and a map screen. The home screen, as shown, may be used for performing key fob functions and viewing vehicle alerts. The vehicle screen (e.g., as shown in FIG. 9) may be used for accessing status information as well as features and settings of the selected vehicle 102. The service screen may be used for managing feature such as roadside assistance, scheduling of service, viewing service history, maintenance schedule, viewing a reference guide, etc. The map screen may be used for displaying a navigational map as well as various overlays, such as chargers, repair shops, and vehicle dealers.

The HMI 802 may include an active profile selector 806 to allow the user to select from one or more vehicles 102 configured to be controlled using the mobile control application 114. As shown, the mobile control application 114 is currently configured to control "Vehicle 1." The user may select the active profile selector 806 to display a dropdown list of the different vehicles 102 that are available. The mobile control application 114 may further provide an illustration 808 providing a representation of the active vehicle 102. This representation may be an image of the same make, model, and/or color of the active vehicle 102, e.g., to ease in understanding which vehicle 102 is being controlled. An account control 810 may also be provided, to allow the user to access functions such as messages to the user, rewards, settings, etc.

In some cases, the cloud server 118 may have alerts that are available for the vehicle 102. These may be displayed to the user in the alerts section 812. As shown, there is an alert to the user that Vehicle 1 should have its oil changed soon.

The HMI 802 may further include a set of virtual fob controls 814 to provide access functions that, when selected, may be performed to the vehicle 102 indicated as being active in the active profile selector 806. The virtual fob controls 814 may include a remote start button 814A that, when selected, directs the mobile control application 114 to send a message to the vehicle 102 to attempt to start the vehicle 102. The virtual fob controls 814 may also include an unlock button 814B that, when selected, directs the mobile control application 114 to send a message to the vehicle 102 to attempt to unlock the vehicle 102, and a lock button 814C that, when selected, directs the mobile control application 114 to send a message to the vehicle 102 to attempt to lock the vehicle 102. The virtual fob controls 814 may also include an alarm button 814D that, when selected, directs the mobile control application 114 to send a message to the vehicle 102 to attempt to trigger the vehicle 102 alarm (e.g., to cause the vehicle 102 to flash its lights and/or honk the horn). To perform the requested functions, the mobile control application 114 may direct the mobile device 112 to communicate with the vehicle 102 over the wide-area network 116 and/or via a local connection.

As shown by a hand indication 816, the user may select the vehicle screen from the menu control 804 to change to the vehicle screen. The vehicle screen may be displayed in response to this selection.

FIG. 9 illustrates an example 900 of the vehicle screen of the mobile control application 114 displayed to the HMI 802 of the mobile device 112. As shown, the active profile selector 806 becomes fixed to the selected vehicle 102, and additional vehicle information 902 about the vehicle 102 is made available. The vehicle information 902 may include, as some examples, the current odometer reading of the selected vehicle 102, the fuel level the selected vehicle 102, and the range of the selected vehicle 102.

The HMI 802 may further include an expandable status region 904 and an expandable features & settings region 906. As shown, the status region 904 is in an unexpanded state, while the features & settings region 906 is in an expanded state. The expanded and unexpanded state may be toggled by touching the titles of the expandable status region 904 and or features & settings region 906. Up and down arrow indications may also be shown in combination with the status region 904 and the features & settings region 906 to visually confirm the expanded and unexpanded state, with a down arrow indicating that the region may be opened, and a up arrow indicating that the region may be closed. While shown as unexpanded, when opened the status region 904 may include options such as tire pressure monitoring and oil life. As shown as expanded, the feature & settings region 906 includes options for a Wi-Fi hotspot provided by the vehicle 102 as well as for filters 104 set up with the vehicle 102.

As shown by a hand indication 816, the user may select the filters 104 from the features & settings region 906 to change to the main options screen for the filters 104. The main filter options screen may be displayed in response to this selection.

Figure 10:
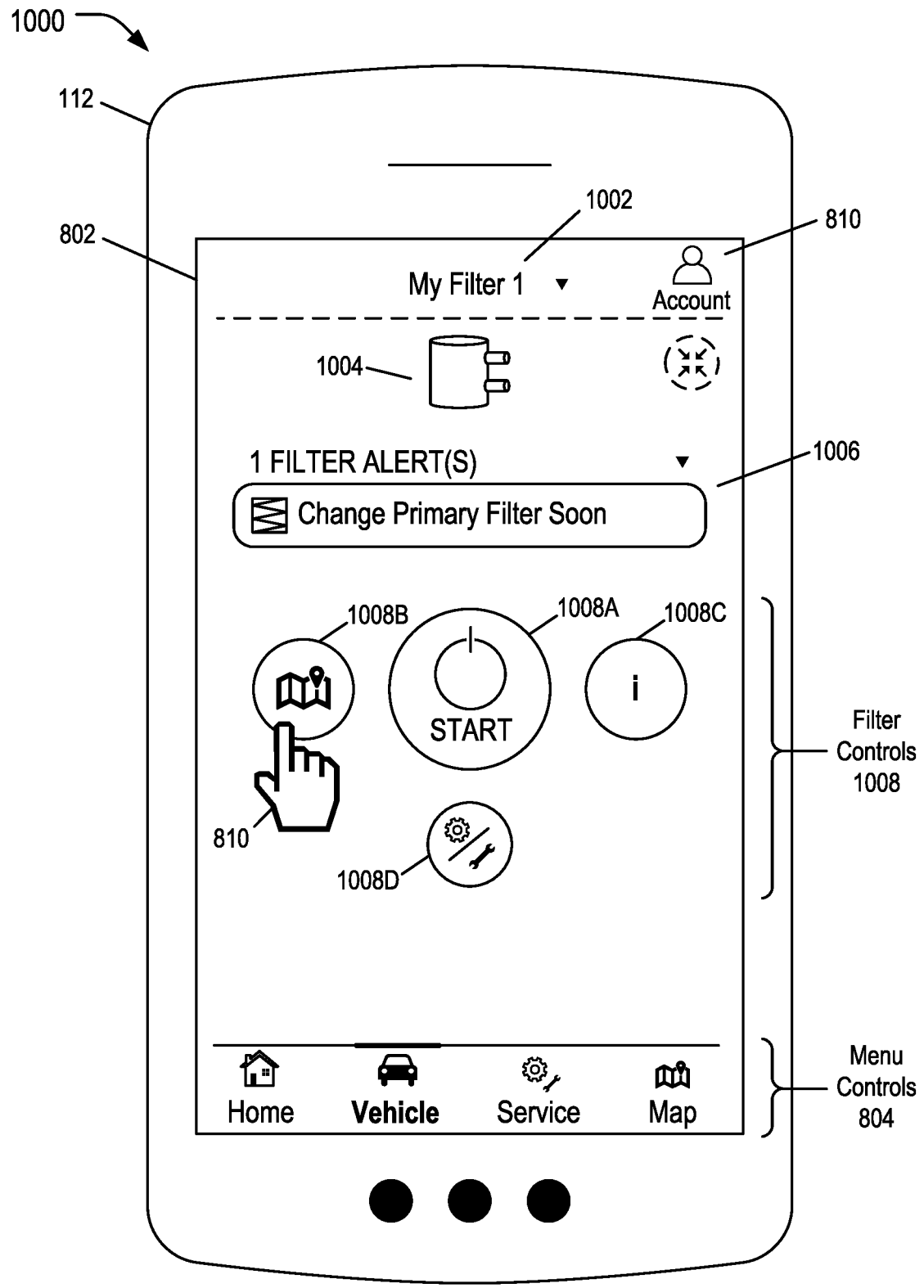
FIG. 10 illustrates an example of the main filter options screen of the mobile control application displayed to the HMI of the mobile device.

FIG. 10 illustrates an example 1000 of the main filter options screen of the mobile control application 114 displayed to the HMI 802 of the mobile device 112. As shown, the main options screen may have some similarity in design to the home screen of the mobile control application 114 shown with respect to FIG. 7. However, the main filter options screen shows options for configuration of the filters 104.

For example, the HMI 802 may include an active filter selector 1002 to allow the user to select from one or more filters 104 configured to be controlled using the mobile control application 114. As shown, the mobile control application 114 is currently configured to control "My Filter 1." The user may select the active filter selector 1002 to display a dropdown list of the different filters 104 that are available. The mobile control application 114 may further provide a filter illustration 1004 providing a representation of the active filter 104. This representation may be an image of the same make, model, and/or color of the active filter 104, e.g., to ease in understanding which filter 104 is being controlled.

In some cases, the cloud server 118 may have alerts that are available for the filter 104. These may be displayed to the user in the alerts section 1006. As shown, there is an alert to the user that My Filter 1 should have its primary filter media 110 changed soon. The alerts may be sent to the mobile control application 114 from the cloud server 118, such as the errors discussed above with respect to FIGS. 3-4. For example, the alerts may include weather alerts that indicate that the filter 104 may be exposed to cold temperatures, and/or alerts that the filter 104 is no longer received water flow, require maintenance, or is otherwise not functioning properly.

The HMI 802 may further include a set of filter controls 1008 to provide access functions that, when selected, may be performed to the filter 104 indicated as being active in the active filter selector 1002. The filter controls 1008 may include a start/stop button 1008A that, when selected, directs the mobile control application 114 to send a message to the vehicle 102 to attempt to start the filter 104. Once started, the text of the start/stop button 1008A may change from "start" to "stop," and when selected again, directs the mobile control application 114 to send a message to the filter 104 to attempt to stop the filter 104 from filtering. To perform the requested functions, the mobile control application 114 may direct the mobile device 112 to communicate with the vehicle 102 over the wide-area network 116 to, in turn communicate the message to the filter 104. Or, in another example, the mobile device 112 may communicate with the filter 104 directly over a local connection. Or, in yet another example, the mobile device 112 may communicate with the vehicle 102 over a local connection, where the vehicle 102 in turn communicates with the filter 104 over a local connection.

Figure 11:
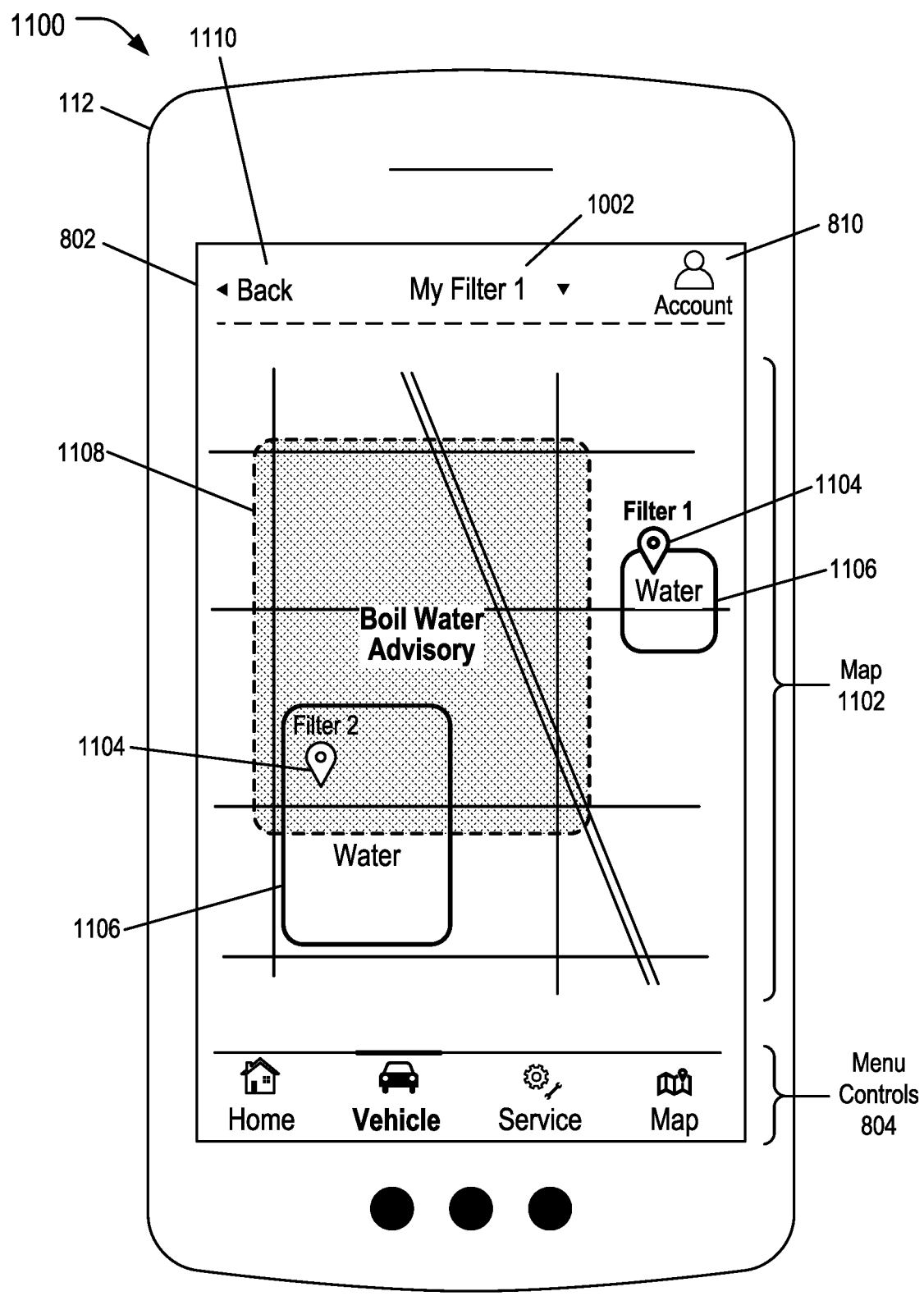
FIG. 11 illustrates an example of the map screen of the mobile control application displayed to the HMI of the mobile device.

The filter controls 1008 may also include a map button 1008B that, when selected, directs the mobile control application 114 to display a map screen showing the locations of the filters 104 and/or any advisory areas. Further aspects of the map screen are shown in FIG. 11. As shown by a hand indication 816, the user may select the map screen by pressing the map button 1008B. The map screen may be displayed in response to this selection.

Figure 12A:
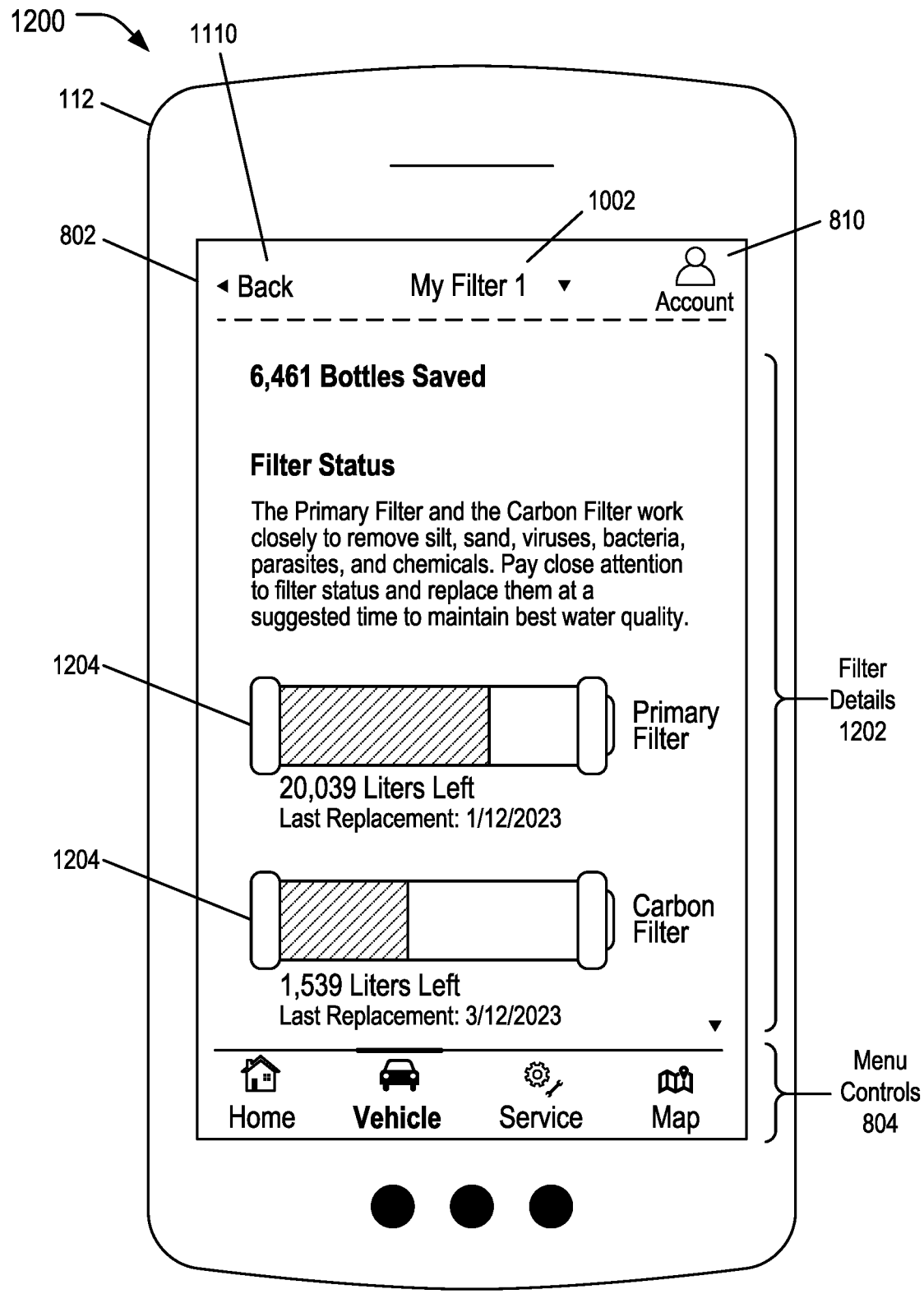
FIG. 12A illustrates a portion of an example of the filter information screen of the mobile control application displayed to the HMI of the mobile device.
Figure 12B:
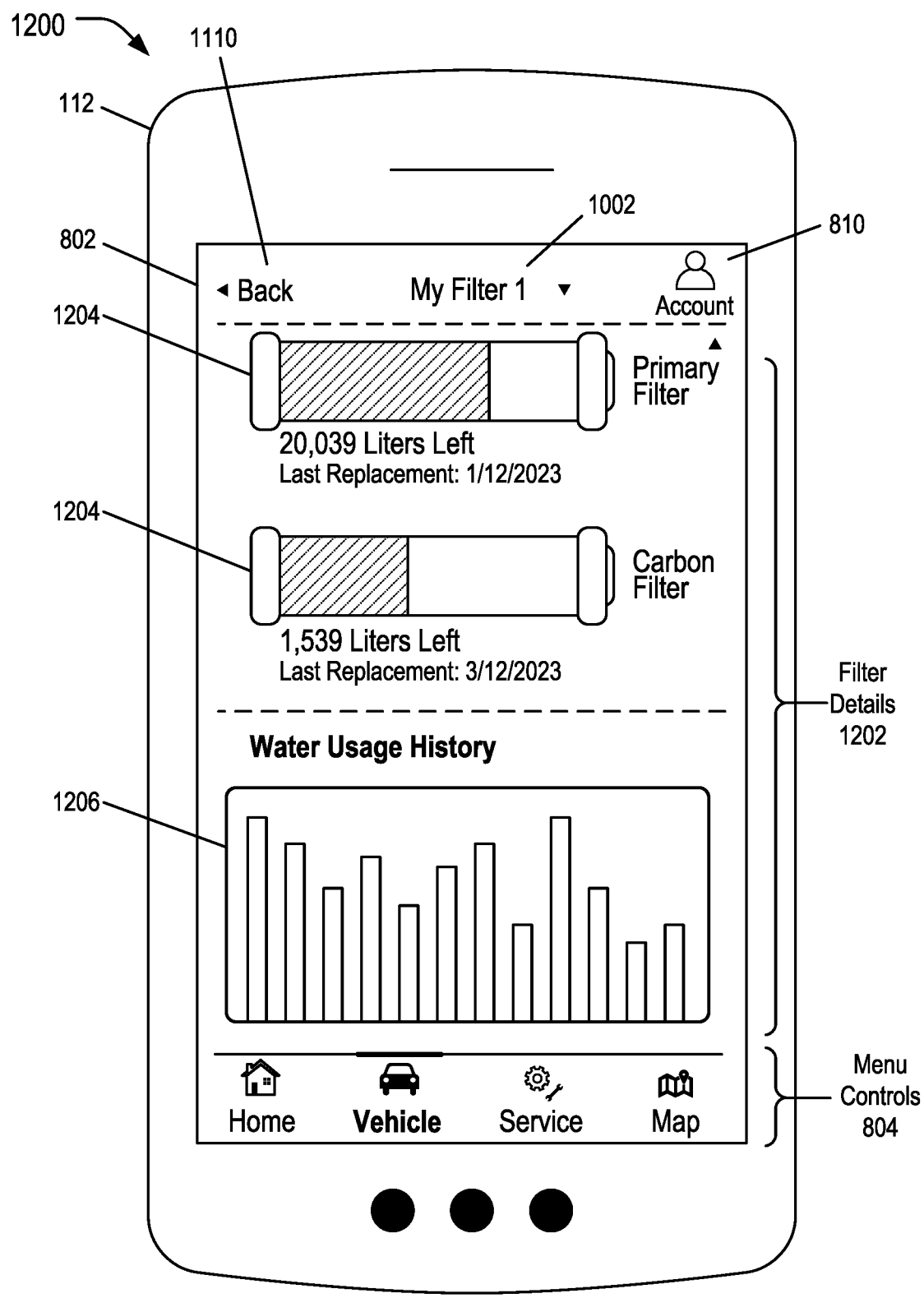
FIG. 12B illustrates a further scrolled portion of an example of the filter information screen of the mobile control application displayed to the HMI of the mobile device.

The filter controls 1008 may also include an information button 1008C that, when selected, directs the mobile control application 114 to display an information screen showing details of the filter 104 selected in the active filter selector 1002. Further aspects of the information screen are shown in FIGS. 12A-B.

Figure 13A:
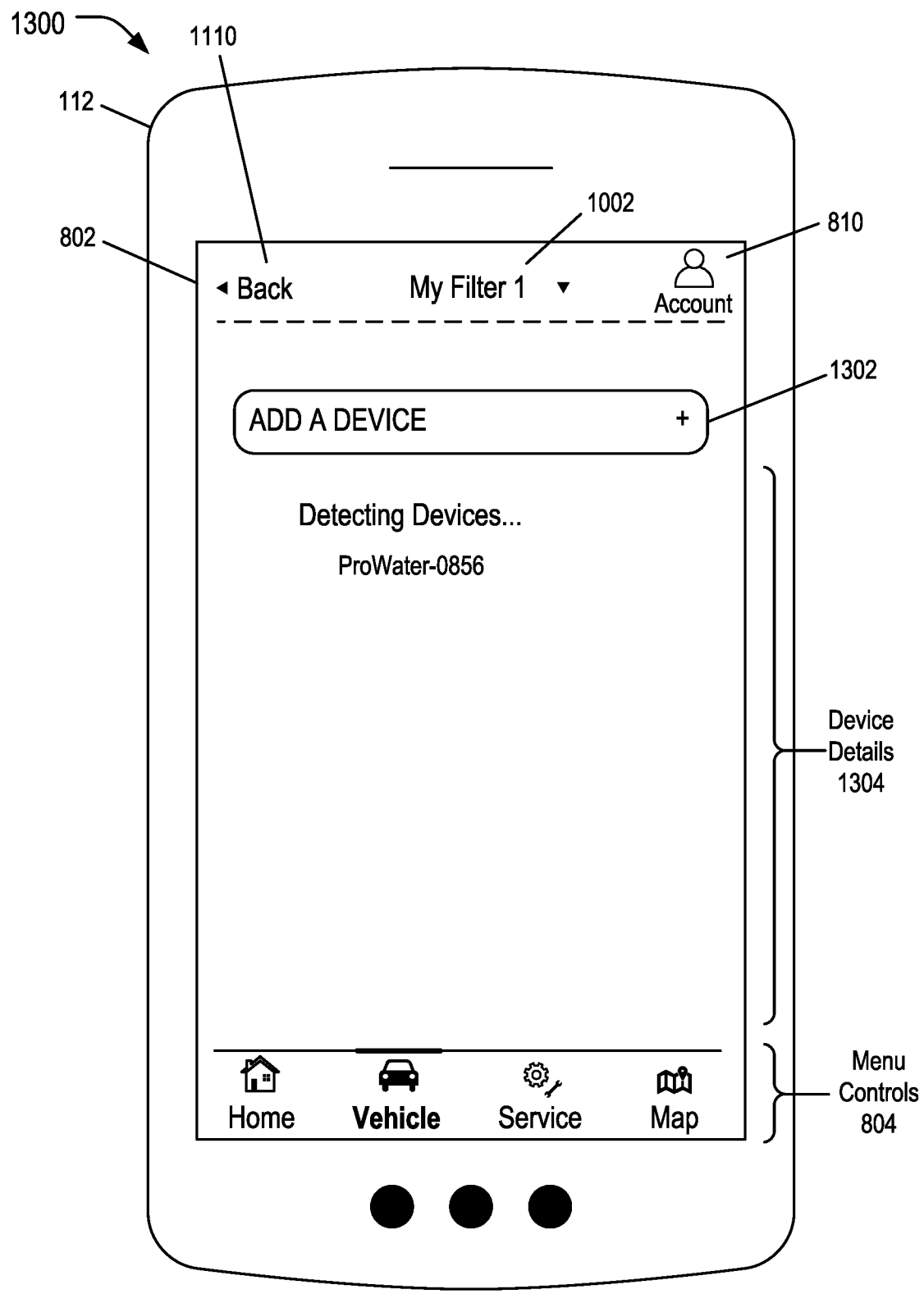
FIG. 13A illustrates an example of a configure filters screen of the mobile control application displayed to the HMI of the mobile device.
Figure 13B:
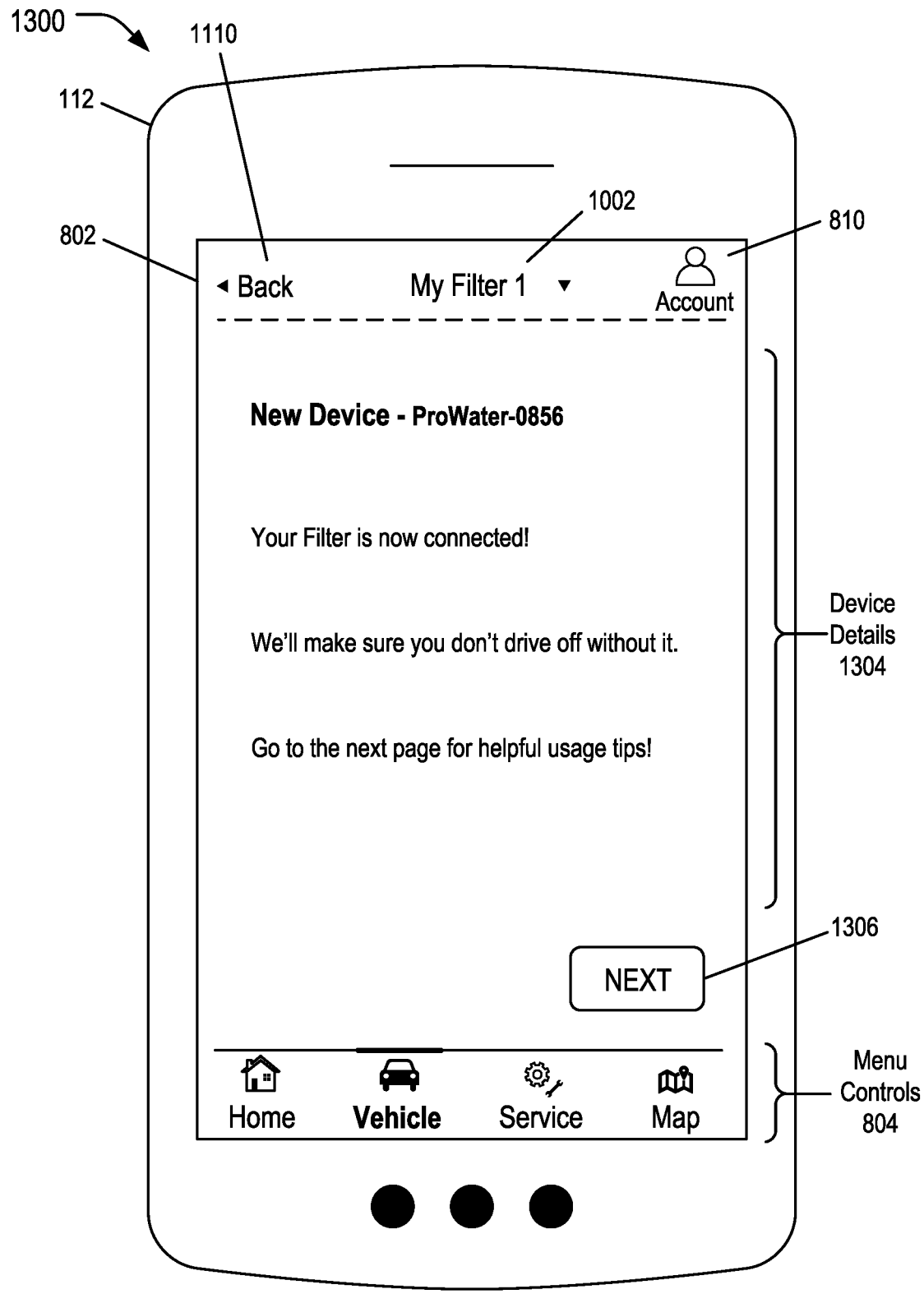
FIG. 13B illustrates a further example of the configure filters screen of the mobile control application displayed to the HMI of the mobile device.

The filter controls 1008 may also include a configure filters button 1008D that, when selected, directs the mobile control application 114 to display a configure filters screen for adding new filters 104 to the mobile control application 114. Further aspects of the configure filters screen are shown in FIGS. 13A-B.

FIG. 11 illustrates an example 1100 of the map screen of the mobile control application 114 displayed to the HMI 802 of the mobile device 112. As shown, the bulk of the display is utilized by a map 1102. The map 1102 may be configured to show the area in which the filter 104 selected from the active filter selector 1002 is located. In some examples, the map 1102 may also show filter location pins 1104 indicating the locations of shared filters 104 as well. In the illustrated example, the location of the selected filter 104 is shown in a bold or highlight overlaid on the map 1102 at its location and another filter 104 is also shown on the map 1102. The locations of shared filters 104 may be received to the mobile device 112 from the cloud server 118, such as discussed with respect to the process 600.

The map 1102 may also be configured to show locations where water is available. The water availability information may be received to the mobile device 112 from the cloud server 118, such as discussed with respect to the process 500. As shown, water availability areas 1106 are overlaid on the map 1102 over an area indicated by the cloud server 118. These are shown as bolded regions in this example. These regions may allow a user to easily see the locations of any areas where the filter 104 may be readily installed.

The map 1102 may also be configured to show water advisory information. The water advisory information may be received to the mobile device 112 from the cloud server 118, such as discussed with respect to the process 700. As shown a boil water advisory indication 1108 is overlaid on the map 1102 over an area indicated by the cloud server 118. This boil water advisory indication 1108 includes a portion of one of the water availability area 1106, and in particular the portion of the water availability area 1106 in which the Filter 2 is located. This may allow a user to easily see the locations of any areas where the filter 104 should be utilized to clean the water before the water is put to use.

When the user is done with the map 1102, the user may select the back control 1110 to return to the main filter options screen. For example, the user may return to the main filter options screen and then select the information button 1008C to review information about the filter 104 selected from the active filter selector 1002.

FIGS. 12A-B collectively illustrate an example 1200 of the filter information screen of the mobile control application 114 displayed to the HMI 802 of the mobile device 112. As shown, the bulk of the display is utilized by filter details 1202. The filter details 1202 may be configured to explain various aspects of the operation of the filter 104 selected from the active filter selector 1002 is located. This information may be provided to the mobile device 112 from the cloud server 118, based on the filter information 108, e.g., as discussed with respect to the process 200.

For instance, the filter details 1202 may indicate how many bottle equivalents of water were filtered using the filter 104, e.g., how many bottles were saved by using the filter 104 instead. In another example, the filter details 1202 may indicate the amount of life remaining in the filter media 110 of the filter 104. For instance, this may be shown graphically for each filter media 110 of the filter 104. In the illustrated example, the filter 104 includes primary filter medium 110 having a total capacity to filter, remaining liters to filter, and a time of last replacement, and also a secondary carbon filter medium 110, also with its own total capacity to filter, remaining liters to filter, and a time of last replacement. In yet another example, the filter detail 1202 may include a graph of water usage history of the filter 104, which may be useful for a user in tracking the user of the filter 104 over time.

When the user is done with the filter details 1202, the user may select the back control 1110 to return to the main filter options screen. For example, the user may return to the main filter options screen and then select the configure filters button 1008D to add another filter 104 for use by the mobile control application 114.

FIGS. 13A-B collectively illustrate an example 1300 of the configure filters screen of the mobile control application 114 displayed to the HMI 802 of the mobile device 112. As shown, the example 1300 includes an add a device control 1302 that, when selected, causes the mobile device 112 to detect filters 104 in the proximity of the mobile device 112. In one non-limiting example, the mobile device 112 may utilize BLUETOOTH discovery protocols to locate new filters 104. In another example, the mobile device 112 may use other wireless techniques such as querying over Wi-Fi. In yet another example, the mobile device 112 may allow the user to manually type in information about a filter 104, such as a media access control (MAC) address or Internet protocol (IP) address. In still other examples, the vehicle 102 may perform the discovery and may relay the information about the discovered devices to the mobile device 112.

Regardless of the specifics, any new devices may be displayed in the HMI 802 in a device details 1304 view. As shown, a new filter 104 is located, named ProWater-0846. Responsive to selection of any filters 104 from the device details 1304, those devices may be added for use by the mobile control application 114. For instance, these additional filters 104 may then be made available for selection via the active filter selector 1002, and/or for display in the map 1102.

As shown in FIG. 13B, responsive to selection of the new filter 104, the device details 1304 is updated to indicate that the filter 104 may now be configured for use. For example, the user may select the next button 1306 to further set up the filter 104, including, for example, setting a custom name for the filter 104. The filter 104 may also be paired to the vehicle 102, such that the vehicle 102 may now remind the user if the filter 104 is not detected by the vehicle 102 if the vehicle 102 is set to a motive mode (e.g., drive, reverse).

Figure 14:
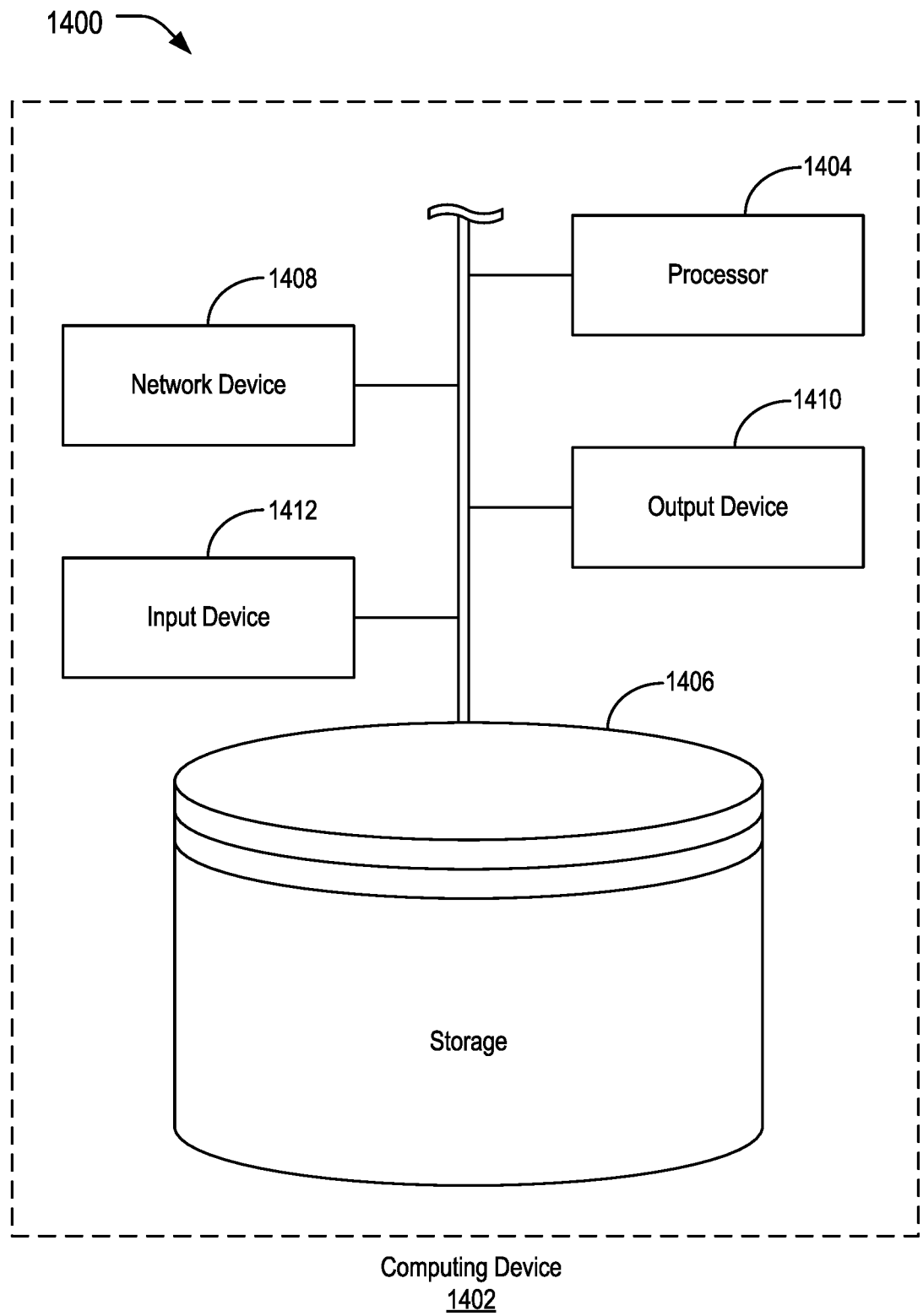
FIG. 14 illustrates an example of a computing device for use in using the vehicle as a hub for locating and filtering water using the filters.

FIG. 14 illustrates an example 1400 of a computing device 1402 for use in using the vehicle 102 as a hub for locating and filtering water using the filters 104. Referring to FIG. 14, and with reference to FIGS. 1-13B, the vehicles 102, filters 104, mobile devices 112, cloud server 118, etc., may include examples of such computing devices 1402. As shown, the computing device 1402 may include a processor 1404 that is operatively connected to a storage 1406, a network device 1408, an output device 1410, and an input device 1412. It should be noted that this is merely an example, and computing devices 1402 with more, fewer, or different components may be used.

The processor 1404 may include one or more integrated circuits that implement the functionality of a central processing unit (CPU) and/or graphics processing unit (GPU). In some examples, the processors 1404 are a system on a chip (SoC) that integrates the functionality of the CPU and GPU. The SoC may optionally include other components such as, for example, the storage 1406 and the network device 1408 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 1404 executes stored program instructions that are retrieved from the storage 1406. The stored program instructions, accordingly, include software that controls the operation of the processors 1404 to perform the operations described herein, such as those of the mobile control application 114. The storage 1406 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1410. The output device 1410 may include a graphical or visual display device, such as an electronic display screen, projector, printer, or any other suitable device that reproduces a graphical display. As another example, the output device 1410 may include an audio device, such as a loudspeaker or headphone. As yet a further example, the output device 1410 may include a tactile device, such as a mechanically raiseable device that may, in an example, be configured to display braille or another physical output that may be touched to provide information to a user.

The input device 1412 may include any of various devices that enable the computing device 1402 to receive control input from users. Examples of suitable input devices that receive human interface inputs may include keyboards, mice, trackballs, touchscreens, voice input devices, graphics tablets, and the like.

The network devices 1408 may each include any of various devices that enable the vehicles 102, filters 104, mobile devices 112, and/or cloud servers 118, to send and/or receive data from external devices over networks (such as the wide-area network 116). Examples of suitable network devices 1408 include an Ethernet interface, a Wi-Fi transceiver, a cellular transceiver, a satellite transceiver, a V2X transceiver, a BLUETOOTH or BLE transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of using a vehicle as a hub for locating and filtering water, comprising:
    receiving, by the vehicle, filter information over a local network connection between the vehicle and a water filter;
    sending the filter information over a wide-area network from the vehicle to a cloud server; and
    displaying, to a human machine interface (HMI) remote from the filter, filter details based on the filter information that explain aspects of the operation of the filter.

2. The method of claim 1, wherein the filter details indicate remaining life of filter media of the filter based on the analysis performed by a machine learning model executed by the cloud server.

3. The method of claim 1, wherein the filter information including data from pressure sensors, temperature sensors, and/or flow sensors of the filter.

4. The method of claim 1, further comprising:
    determining, based on the filter information, that the filter will be exposed to freezing temperatures, and
    one or more of:
        displaying, to the HMI, an alert indicating the freezing temperatures, or
        sending a command to the filter to deactivate the filter responsive to identifying the freezing temperatures.

5. The method of claim 1, further comprising:
    identifying by the cloud server, based on the filter information, that the filter is malfunctioning; and
    one or more of:

displaying, to the HMI, an alert indicating the malfunction, or sending a command to the filter to deactivate the filter responsive to identifying the malfunction.

6. The method of claim 1, wherein the filter information includes a location of the filter, and further comprising displaying the location of the filter overlaid on a map.

7. The method of claim 6, further comprising one or more of:
displaying, to the HMI, locations of water advisories as an overlay on the map; or
displaying, to the HMI, locations of water availability as an overlay on the map.

8. The method of claim 6, further comprising:
maintaining, by the cloud server, locations of a plurality of water filters that are shared; and
displaying, to the HMI, the locations of the plurality of water filters as an overlay on the map.

9. The method of claim 1, wherein the local network connection is a BLUETOOTH connection.

10. A vehicle operating as a hub for locating and filtering water, comprising:
a network device; and
one or more computing devices configured to:
receive filter information over a local network connection from a water filter, the filter information including data from pressure sensors, temperature sensors, and/or flow sensors of the filter,
send the filter information over a wide-area network to a cloud server, the cloud server configured to utilize a machine learning model to determine filter details based on the filter information that explain aspects of the operation of the filter,
receive, over the wide-area network a command from the cloud server based on the filter details, and
send the command over the local network connection to the filter to automatically control the filter.

11. The vehicle of claim 10, wherein the command is to deactivate the filter responsive to the machine learning model predicting freezing temperatures.

12. The vehicle of claim 10, wherein the command is to deactivate the filter responsive to the machine learning model predicting that the filter is malfunctioning.

13. The vehicle of claim 10, wherein the vehicle comprises an output device configured to display an HMI, and the one or more computing devices are further configured to:
display a location of the filter overlaid on a map.

14. The vehicle of claim 13, wherein the one or more computing devices are further configured to one or more of:
display, to the HMI, locations of water advisories as an overlay on the map; or
display, to the HMI, locations of water availability as an overlay on the map.

15. The vehicle of claim 13, wherein the one or more computing devices are further configured to:
display, to the HMI, the filter details indicate remaining life of filter media of the filter based on the analysis performed by the machine learning model executed by the cloud server.

16. The vehicle of claim 13, wherein the one or more computing devices are further configured to utilize the network device to detect filters in proximity of the vehicle.

17. A mobile device executing a mobile control application for utilizing a vehicle operating as a hub for locating and filtering water, comprising:
a network device;
an output device configured to display an HMI; and
one or more computing devices configured to:
display, to the HMI, filter details based on filter information that explain aspects of the operation of a water filter, the filter details being received via the network device over a wide-area network from a cloud server, the cloud server having received the filter information over the wide-area network from a vehicle, the vehicle in turn having received the filter information over a local network connection between the vehicle and the water filter.

18. The mobile device of claim 17, wherein the one or more computing devices are configured to:
receive input to the HMI to activate or deactivate the filter; and
send the input to the cloud server to cause the cloud server to command the filter to perform the activate or deactivate.

19. The mobile device of claim 17, wherein the one or more computing devices are further configured to:
display a location of the filter overlaid on a map.

20. The mobile device of claim 19, wherein the one or more computing devices are further configured to one or more of:
display, to the HMI, locations of water advisories as an overlay on the map; or
display, to the HMI, locations of water availability as an overlay on the map.

* * * * *